(12) United States Patent
Chiu et al.

(10) Patent No.: US 11,505,675 B2
(45) Date of Patent: Nov. 22, 2022

(54) POLYCARBONATE RESIN COMPOSITIONS WITH CONSISTENT COLOR AND STABLE BLUE-CUT PERFORMANCE

(71) Applicant: ESSILOR INTERNATIONAL, Charenton-le-Pont (FR)

(72) Inventors: Hao Wen Chiu, Holden, MA (US); Elliot French, Charlton, MA (US); Aref Jallouli, Shrewsbury, MA (US); Haifeng Shan, Shrewsbury, MA (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 63 days.

(21) Appl. No.: 16/335,150

(22) PCT Filed: Sep. 20, 2017

(86) PCT No.: PCT/EP2017/073838
§ 371 (c)(1),
(2) Date: Mar. 20, 2019

(87) PCT Pub. No.: WO2018/055010
PCT Pub. Date: Mar. 29, 2018

(65) Prior Publication Data
US 2019/0264003 A1 Aug. 29, 2019

(30) Foreign Application Priority Data
Sep. 20, 2016 (EP) .................................... 16306204

(51) Int. Cl.
| | |
|---|---|
| *C08K 5/18* | (2006.01) |
| *C08K 5/101* | (2006.01) |
| *C08K 5/00* | (2006.01) |
| *C08K 5/12* | (2006.01) |
| C08K 5/3435 | (2006.01) |
| *C08K 5/3475* | (2006.01) |
| *G02B 1/04* | (2006.01) |
| *G02C 7/10* | (2006.01) |
| C08K 5/17 | (2006.01) |
| C08L 69/00 | (2006.01) |
| G02C 7/02 | (2006.01) |
| C08K 5/08 | (2006.01) |

(52) U.S. Cl.
CPC ............ *C08K 5/3475* (2013.01); *C08K 5/005* (2013.01); *C08K 5/0041* (2013.01); *C08K 5/101* (2013.01); *C08K 5/12* (2013.01); *C08K 5/17* (2013.01); *C08K 5/18* (2013.01); *C08K 5/3435* (2013.01); *G02B 1/041* (2013.01); *G02C 7/10* (2013.01); *C08K 5/08* (2013.01); *C08K 2201/014* (2013.01); *C08L 69/00* (2013.01); *G02C 7/02* (2013.01)

(58) Field of Classification Search
CPC ........ C08K 5/3475; C08K 5/18; C08K 5/101; C08K 5/00; C08K 5/12; G02B 1/04
USPC ........................................................... 524/91
See application file for complete search history.

(56) References Cited

U.S. PATENT DOCUMENTS

| | | | |
|---|---|---|---|
| 5,869,554 A | 2/1999 | Pickett et al. | |
| 5,949,518 A | 9/1999 | Belmares et al. | |
| 2007/0138664 A1* | 6/2007 | Chen ....................... | B29C 45/14 264/1.32 |
| 2007/0216861 A1* | 9/2007 | Ishak ....................... | G02C 7/10 351/159.24 |
| 2009/0029172 A1* | 1/2009 | Isozaki ................... | A61L 27/18 428/412 |
| 2016/0237275 A1* | 8/2016 | Mader ..................... | C08L 25/06 |

FOREIGN PATENT DOCUMENTS

| | | | | |
|---|---|---|---|---|
| EP | 0197508 | | 10/1986 | |
| EP | 1454961 | | 9/2004 | |
| EP | 1580591 | | 9/2005 | |
| EP | 2516494 A1 * | | 10/2012 | .......... C08K 5/1345 |
| JP | 4157427 B2 * | | 10/2008 | |
| WO | WO-2004033558 A1 * | | 4/2004 | ............... B32B 5/16 |
| WO | WO-2011149445 A1 * | | 12/2011 | ............... C08K 5/03 |
| WO | WO-2014073496 A1 * | | 5/2014 | .......... C08G 64/307 |
| WO | WO-2015055674 A1 * | | 4/2015 | .............. C08L 23/06 |
| WO | WO2015/097186 | | 7/2015 | |
| WO | WO-2015186359 A1 * | | 12/2015 | ................ F21S 2/00 |
| WO | WO 2017/077357 | | 5/2017 | |
| WO | WO 2017/077358 | | 5/2017 | |
| WO | WO 2017/077359 | | 5/2017 | |
| WO | WO 2017/137372 | | 8/2017 | |

OTHER PUBLICATIONS

BASF The Chemical Company, Tinuvin 326. No date.*
ChemSpider. Structure of bumetrizole. No date.*
PubChem. No date.*
International Search Report and Written Opinion issued in International Patent Application No. PCT/EP2017/073838, dated Nov. 9, 2017.

* cited by examiner

*Primary Examiner* — Deve V Hall
(74) *Attorney, Agent, or Firm* — Norton Rose Fulbright US LLP

(57) ABSTRACT

Embodiments of the disclosure relate to a series of PC resin additives for maintaining the color stability and blue-cut performance during injection molding. The additives may be used to adapt a PC resin customarily used for sun protection lenses for clear lens applications.

13 Claims, 2 Drawing Sheets

POLYCARBONATE RESIN COMPOSITIONS WITH CONSISTENT COLOR AND STABLE BLUE-CUT PERFORMANCE

CROSS-REFERENCE TO RELATED APPLICATIONS

This application is a national phase application under 35 U.S.C. § 371 of International Application No. PCT/EP2017/073838 filed 20 Sep. 2017, which claims priority to European Patent Application No. 16306204.5 filed 20 Sep. 2016. The entire contents of each of the above-referenced disclosures is specifically incorporated by reference herein without disclaimer.

FIELD OF THE INVENTION

The invention relates to the field of ophthalmic lenses, including polarized ophthalmic lenses for spectacles and sunglasses.

BACKGROUND

Lenses made of commercially-available polycarbonate (PC) resins customarily used for sunglass and sunvisor markets have been historically shown to exhibit significantly higher blue-cut performance than those made of clear, ophthalmic-grade PC resins. These PC resins are targeted towards solar lens applications in which the lenses are significantly tinted. When employing these resins in clear, ophthalmic lens applications, a slight yellow tint is apparent. The yellow tint is due in part to the inclusion of UV absorbers that filter blue light.

Injection molded sunglasses lenses using the above-mentioned PC resins include tinting that masks color variations caused by the injection molding process. Because color variations are generally imperceptible in heavily tinted lenses, there is not a need for manufacturers to incorporate additives that minimize color variation. When these PC resins are used to produce clear or lightly-tinted ophthalmic lenses by injection molding, color variation becomes apparent. Lenses using the above-mentioned PC resins may gradually change color appearance during service resulting from photo-degradation of the PC resin and added colorants. This change in lens color has been shown to affect blue-cut performance.

Photo-degradation and color variation may be reduced or prevented by the inclusion of additives that provide proper protection. There is a need in the industry for clear, ophthalmic grade lenses that provide protection from blue light. Because color variation is more apparent in clear lenses, it is important to incorporate an additive package that minimizes color variation during lens production and provides long-term light protection to the lens components.

SUMMARY

It is an object of the disclosure to provide a polycarbonate resin for use in clear lenses that offers blue-light blocking functionality, or blue-cut performance, that is comparable to sunglass lenses. The inclusion of blue-cut functionality in clear lenses will help protect prescription eyeglass wearers from phototoxic blue light. In some embodiments, the polycarbonate resin comprises a UV absorber. In order to offset the yellow tint imparted by a UV absorber, a colorant may be added to the polycarbonate resin.

The polycarbonate resin may include other additives, such as antioxidants and light stabilizers in order to produce lenses with consistent color. Hence, it is one object of the disclosure to provide an additive package to be incorporated into base PC resins with 400 nm UV cut-offs to protect the resin during processing and minimize color variation of the resulting lenses. It is another object of the disclosure for the proposed additive package to further protect the lenses from color changes due to photo-degradation. The presently-disclosed additives and resin formulations provide for the production of clear lenses with consistent color and constant blue-cut performance during service.

A high blue-cut performance polycarbonate resin composition for use in clear lenses is provided herein. In some embodiments, a clear lens is a tinted or untinted lens with a luminous transmittance of light within the visible spectral range ranging from 80% or greater to 100%. In some embodiments, the polycarbonate resin composition comprises a polycarbonate polymer, a UV absorber, a colorant additive, and a light stabilizer. In some aspects, the polycarbonate polymer is a base resin. In other embodiments, a base resin comprises a polycarbonate polymer and a UV absorber. In some aspects, the base resin blocks greater than 99% of light with a wavelength less than 400 nm at each wavelength in the wavelength range of 315-400 nm, and partially blocks blue light in the 400-500 nm range. In some aspects, the resin composition blocks greater than 99% of light with a wavelength less than 400 nm at each wavelength in the wavelength range of 315-400 nm, and partially blocks blue light in the 400-500 nm range. In some embodiments, the polycarbonate polymer has a weight average molecular weight ranging from about 20,000 to about 40,000 g/mol.

UV absorbers are frequently incorporated in optical articles in order to reduce or prevent UV light from reaching the retina (in particular in ophthalmic lens materials). In addition, UV absorbers protect the substrate material from UV light, thus preventing it from weathering and becoming brittle and/or yellow. In some aspects, the UV absorber preferably has the ability to at least partially block light having a wavelength shorter than 400 nm, preferably UV wavelengths below 385 or 390 nm, but also has an absorption spectrum extending to the visible blue light range (400-500 nm). Most preferred ultraviolet absorbers have a maximum absorption peak in a range from 350 nm to 370 nm and/or do not absorb light in the 465-495 nm range, preferably the 450-550 nm range.

In some aspects, the polycarbonate resin UV absorber is a benzotriazole absorber. Suitable UV absorbers include without limitation 2-(2-hydroxyphenyl)-benzotriazoles such as 2-(2-hydroxy-3-t-butyl-5-methylphenyl) chlorobenzotriazole, 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(3,5-di-t-amyl-2-hydroxyphenyl) benzotriazole, and the 2-hydroxy-5-acryloxyphenyl-2H-benzotriazoles disclosed in U.S. Pat. No. 4,528,311 and also Tinuvin®CarboProtect® from BASF. Preferred absorbers are of the benzotriazole family. Commercially available products include Tinuvin 326 from BASF, Seesorb 703 from Cipro, Viosorb 550 from Kyodo Chemicals, and Kemisorb 73 from Chemipro, Tinuvin®CarboProtect®. In specific aspects, the UV absorber is 2-(5-chloro-2H-benzotriazole-2-yl)-6-(1,1-dimethylethyl)-4-methyl phenol. In some embodiments, the polycarbonate resin comprises 0.05 to 1% by weight of a UV absorber.

In some aspects, the polycarbonate resin comprises a colorant additive. Suitable colorant additives can be selected from azo dyes, polymethyne dyes, arylmethyne dyes, polyene dyes, anthracinedione dyes, pyrazolone dyes, anthraquinone dyes, auinophtalone dyes, and carbonyl dyes. In some aspects, the polycarbonate resin colorant additive is a blue dye, violet dye, red dye, or any combination thereof. In some embodiments, the blue dye is an anthraquinone dye. In further aspects, the blue dye is 1,4-di(2,6-dibromo-4-methylphenylamino) anthracene-9,10-dione.

In some aspects, a resin composition comprises at least one hindered amine light stabilizer, and/or at least one antioxidant, more preferably at least one hindered amine light stabilizer and at least one antioxidant. This combination of free radical scavengers offers the best protection from thermal and photo degradation to optical filtering means. Protection of optical filtering means from photo-degradation can also be reinforced by the presence on the optical article of an antireflection coating containing at least one mineral/dielectric layer.

In some embodiments, the polycarbonate resin further comprises an antioxidant or heat-stabilizer. Preferred antioxidants are sterically hindered phenols, benzenepropanoic acid esters, thioethers or phosphites. In further embodiments, the antioxidant is a benzenepropanoic acid ester. In specific embodiments, the antioxidant is the benzenepropanoic acid ester, 3(1,1-dimethylethyl)-4-hydroxy-5-methyl-1,1'-[1,2-ethanediylbis(oxy-2,1-ethanediyl)] ester. In some embodiments, 0.05 to 1% by weight of an antioxidant is added to a polycarbonate resin.

In some aspects, the polycarbonate resin may further comprise a light stabilizer. In some embodiments, the light stabilizer is a hindered amine light stabilizer. In further aspects, the hindered amine light stabilizer is bis(1,2,2,6,6-pentamethyl-4-piperidinyl)-[[3,5-bis(1,1-dimethylethyl)-4-hydroxyphenyl]methyl]butylmalonate. In some embodiments, 0.05 to 1% by weight of a light stabilizer is added to a polycarbonate resin. In additional aspects, the resin may further comprise a selective blue blocking filter, also referred to herein as a selective filter.

In further embodiments, the presently disclosed resin is used to produce a clear lens with a D65 transmittance of greater than 85% for a 1.1 mm thick lens. In some embodiments, lenses comprising the presently disclosed resin composition have a BVC(B') value of ≥15%, preferably of ≥18%, more preferably of ≥20%. In additional embodiments, the clear lens may further comprise at least one wafer overmold for increasing at least one of blue-cut performance, color balance, and lens clarity.

In a further embodiment, a method for producing clear lenses with improved optical characteristics and/or degradation resistance from a base resin is disclosed. In some embodiments, a base resin is a commercially available blue-cut performance resin, which includes a UV absorber. In some embodiments, the base resin is Teijin Panlite L-1250VX PC resin, Bayer Makrolon LQ3187, or Sabic Lexan OQ4120, OQ4320, OQ4320R, OQ4620, or OQ4620R. In some aspects, a base resin comprises a polycarbonate polymer and a UV absorber. Base resins are typically used for sunglass and sunvisor markets and may include a UV blocker in the resin composition. In some aspects, a method for producing clear lenses with improved optical characteristics and/or degradation resistance comprises the step of obtaining a base resin and adding one or more additives selected from the group consisting of a colorant additive, an antioxidant, a light stabilizer, and a selective blue blocking filter. In some aspects, an additional or supplementary UV blocker is added to the base resin. In some embodiments, the base resin blocks greater than 99% of light with a wavelength less than 400 nm at each wavelength in the wavelength range of 315-400 nm.

In some embodiments, a benzotriazole UV absorber is added to a base resin. Suitable UV absorbers include without limitation 2-(2-hydroxyphenyl)-benzotriazoles such as 2-(2-hydroxy-3-t-butyl-5-methylphenyl) chlorobenzotriazole, 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(3,5-di-t-amyl-2-hydroxyphenyl) benzotriazole, and the 2-hydroxy-5-acryloxyphenyl-2H-benzotriazoles disclosed in U.S. Pat. No. 4,528,311 and also Tinuvin®CarboProtect® from BASF. Preferred absorbers are of the benzotriazole family. Commercially available products include Tinuvin 326 from BASF, Seeseorb 703 from Cipro, Viosorb 550 from Kyodo Chemicals, and Kemisorb 73 from Chemipro, Tinuvin®CarboProtect®. In specific aspects, the UV absorber is 2-(5-chloro-2H-benzotriazole-2-yl)-6-(1,1-dimethylethyl)-4-methyl phenol. In some embodiments, 0.05 to 1% by weight of a UV absorber is added to a base resin.

In some aspects, a at least one colorant additive is added to a base resin. Suitable colorant additives can be selected from azo dyes, polymethyne dyes, arylmethyne dyes, polyene dyes, anthracinedione dyes, pyrazolone dyes, anthraquinone dyes, auinophtalone dyes, and carbonyl dyes. In some aspects, a blue dye colorant additive is added to a base resin. In some aspects, the polycarbonate resin colorant additive is a blue dye, violet dye, red dye, or any combination thereof. In some embodiments, the blue dye is an anthraquinone dye. In further aspects, the blue dye is 1,4-di(2,6-dibromo-4-methylphenylamino) anthracene-9,10-dione. In some embodiments, 0.1 to 20 ppm of a dye is added to a base resin. In preferred embodiments, 5 to 10 ppm of a dye is added to a base resin.

In some embodiments, an antioxidant or heat-stabilizer is added to a base resin. Preferred antioxidants are benzenepropanoic acid esters, sterically hindered phenols, thioethers or phosphites. In further embodiments, the antioxidant is a benzenepropanoic acid ester. In specific embodiments, the antioxidant is the benzenepropanoic acid ester 3(1,1-dimethylethyl)-4-hydroxy-5-methyl-1,1'-[1,2-ethanediylbis(oxy-2,1-ethanediyl)] ester. In some embodiments, 0.05 to 1% by weight of an antioxidant is added to a base resin.

In some aspects, a light stabilizer is added to a base resin. In some embodiments, the light stabilizer is a hindered amine light stabilizer. Preferred hindered amine light stabilizers are derivatives of piperidine, such as derivatives of 2,2,6,6-tetramethyl piperidine. In further aspects, the hindered amine light stabilizer is bis(1,2,2,6,6-pentamethyl-4-piperidinyl)-[[3,5-bis(1,1-dimethylethyl)-4-hydroxyphenyl] methyl] butylmalonate. In some embodiments, 0.05 to 1% by weight of a light stabilizer is added to a base resin.

In some aspects, the resin composition further comprises at least one selective filter. A selective filter selectively inhibits/blocks transmission of light in a selected wavelength range chosen within the 400-500 nm range, preferably in the 400-460 nm range. In some aspects, a selective filter has little or no effect on transmission of wavelengths outside the selected wavelength range, unless specifically configured to do so. The bandwidth of the selected range can preferably range from 10 to 70 nm, preferably from 10 to 60 nm more preferably 20 to 50 nm.

In some embodiments the selective filter preferably blocks or cuts at least 5% of the light in the selected wavelength range, preferably at least 8%, more preferably at least 12%. The phrase "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted. As used herein, the light blocked in this way is light arriving on the main face of the optical article onto which the layer comprising the at least one optical filtering means is deposited, generally the front main face.

In some aspects, the selective filter is a notch filter. Preferably, the selective filter is an absorbing dye at least partially absorbing light in the 400-500 nm wavelength range, preferably in the 400-460 nm wavelength range. The chemical nature of the absorbing dye that may act as filter for at least partially inhibiting light having the selected wavelength range is not particularly limited as far as the absorbing dye acts as a selective filter. Blue light blocking dyes, typically yellow dyes, are preferably selected to have little or no absorbance in other parts of the visible spectrum to minimize the appearance of other colors.

Porphyrins are well-known macrocycle compounds composed of four modified pyrrole subunits interconnected at their carbon atoms via methine bridges. The parent porphyrin is porphine and substituted porphines are called porphyrins. Porphyrins are the conjugate acids of ligands that bind metals to form (coordination) complexes.

Certain porphyrins or porphyrin complexes or derivatives are interesting in that they provide selective absorption filters having a bandwidth in some cases of for example 20 nm in the selected blue range of wavelengths. The selectivity property is in part provided by the symmetry of the molecules. Such selectivity helps to limit the distortion of the visual perception of color, to limit the detrimental effects of light filtering to scotopic vision and to limit the impact on circadian rhythm.

For example, the one or more porphyrins or porphyrin complexes or derivatives are selected from the group consisting of Chlorophyll a; Chlorophyll b; 5,10, 15,20-tetrakis (4-sulfonatophenyl) porphyrin sodium salt complex; 5,10, 15,20-tetrakis(N-alkyl-4-pyridyl) porphyrin complex; 5,10, 15,20-tetrakis(N-alkyl-3-pyridyl) porphyrin complex, and 5,10,15,20-tetrakis(N-alkyl-2-pyridyl) porphyrin complex, the alkyl being preferably an alkyl chain, linear or branched, comprising 1 to 4 carbon atoms per chain. For example the alkyl may be selected from the group consisting of methyl, ethyl, butyl and propyl.

The complex usually is a metal complex, the metal being selected from the group consisting of Cu cation, Cr(III), Ag(II), In(III), Mn(III), Sn(IV), Fe(III), Co(II), Mg(II) and Zn(II). Cr(III), Ag(II), In(III), Mn(III), Sn(IV), Fe(III), Co(II) and Zn(II) demonstrate absorption in water in the range of 425 nm to 448 nm with sharp absorption peaks. Moreover, the complexes they provide are stable and not acid sensitive. Cr(III), Ag(II), In(III), Sn(IV), Fe(III), in particular, do not exhibit fluorescence at room temperature.

In some embodiments, a base resin is used to produce lenses with a BVC(B') value of ≥20%. In further embodiments, a base resin is used to produce a clear lens with a D65 transmittance of greater than 85% for a 1.1 mm lens. In some embodiments, a resin composition is used to produce lenses with a BVC(B') value of ≥20%. In further embodiments, a resin composition is used to produce a clear lens with a D65 transmittance of greater than 85% for a 1.1 mm lens. In additional embodiments, the clear lens may further comprise at least one wafer overmold for increasing at least one of blue-cut performance, color balance, and lens clarity.

Any embodiment of any of the disclosed compositions and/or methods can consist of or consist essentially of— rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%. "Analogue" and "analog," when referring to a compound, refers to a modified compound wherein one or more atoms have been substituted by other atoms, or wherein one or more atoms have been deleted from the compound, or wherein one or more atoms have been added to the compound, or any combination of such modifications. Such addition, deletion or substitution of atoms can take place at any point, or multiple points, along the primary structure comprising the compound.

"Derivative," in relation to a parent compound, refers to a chemically modified parent compound or an analogue thereof, wherein at least one substituent is not present in the parent compound or an analogue thereof. One such non-limiting example is a parent compound which has been covalently modified. Typical modifications are amides, carbohydrates, alkyl groups, acyl groups, esters, pegylations and the like.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of" or "consist of" any of the ingredients or steps disclosed throughout the specification. With respect to the transitional phase "consisting essentially of" in one non-limiting aspect, a basic and novel characteristic of the compositions and methods disclosed in this specification includes the compositions' abilities to block or reduce passage of blue light through an optical article.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Disclosed herein is a method for improving the color stability of existing polycarbonate resins during processing and that of the lenses made therefrom. More specifically, a combination of various additives including UV blockers, antioxidants, light stabilizers, for example, hindered amine light stabilizers, and colorants may be added to a polycarbonate base resin before being formed into optical lenses. The resulting lenses exhibit consistent color and notable blue-cut performance. The modified resin formulations may be used to produce clear lenses help protect prescription eyeglass wearers from phototoxic blue light.

Blue-cut of a lens is typically defined by:

Blue light cut (%)=100−$T_{sb}$ $$T_{sb} = \frac{\int_{380\,nm}^{500\,nm} T(\lambda) \cdot E_{s\lambda}(\lambda) \cdot B(\lambda) \cdot d\lambda}{\int_{380\,nm}^{500\,nm} E_{s\lambda}(\lambda) \cdot B(\lambda) \cdot d\lambda}$$

where
T($\lambda$): Transmittance (%) with 5 nm pitch
$E_{s\lambda}(\lambda)$: Solar spectral irradiation (ISO 8980-3: Annex B)
B($\lambda$): Blue light hazard function (ISO 8980-3: Annex B)

The experiments and observations disclosed herein espouse a blue-cut performance measure characterized by:

$$BVC(B') = 100\% - \frac{\int_{400\,nm}^{455\,nm} B'(\lambda) \cdot T(\lambda) \cdot d\lambda}{\int_{400\,nm}^{455\,nm} B'(\lambda) \cdot d\lambda}$$

or $$BVC(B) = 100\% - \frac{\int_{400\,nm}^{455\,nm} B(\lambda) \cdot T(\lambda) \cdot d\lambda}{\int_{400\,nm}^{455\,nm} B(\lambda) \cdot d\lambda}$$

where
T($\lambda$): Transmittance (%) with 10 nm pitch
B'($\lambda$): Blue light hazard function (Arnault et al., PlosOne, 2013)
B($\lambda$): Blue light hazard function (ISO 8980-3: Annex B)

Figure 1:
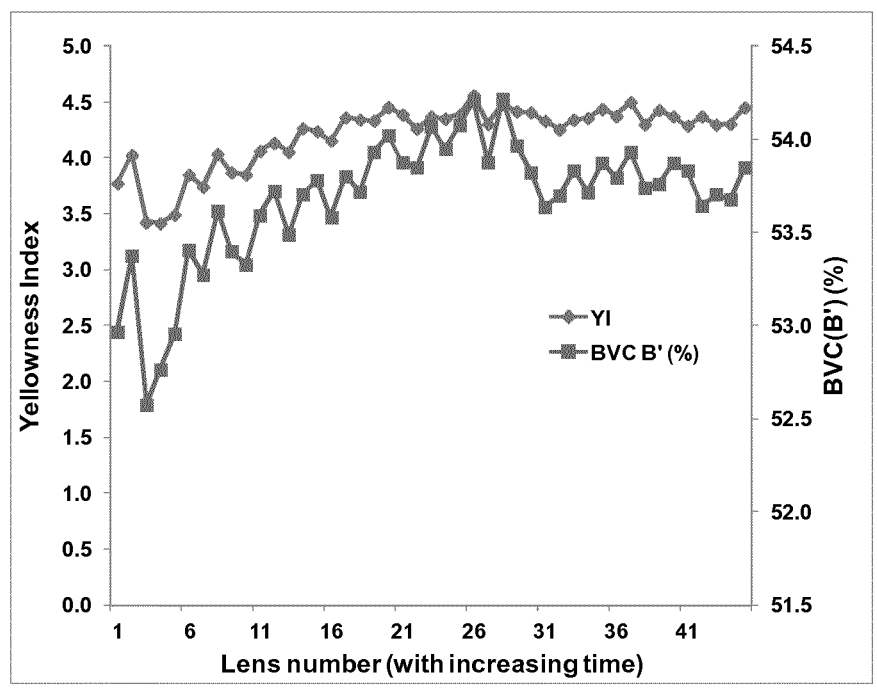
FIG. 1 is a graph depicting yellowness index (YI) and BVC(B') of a series of lenses formed by injection molding of a commercially available polycarbonate resin. The upward drifting of YI and evolution of BVC(B') demonstrate the insufficiency of commercial PC resins of 400 nm UV cut-off in maintaining the color stability and blue-cut performance during injection molding.
Figure 2:
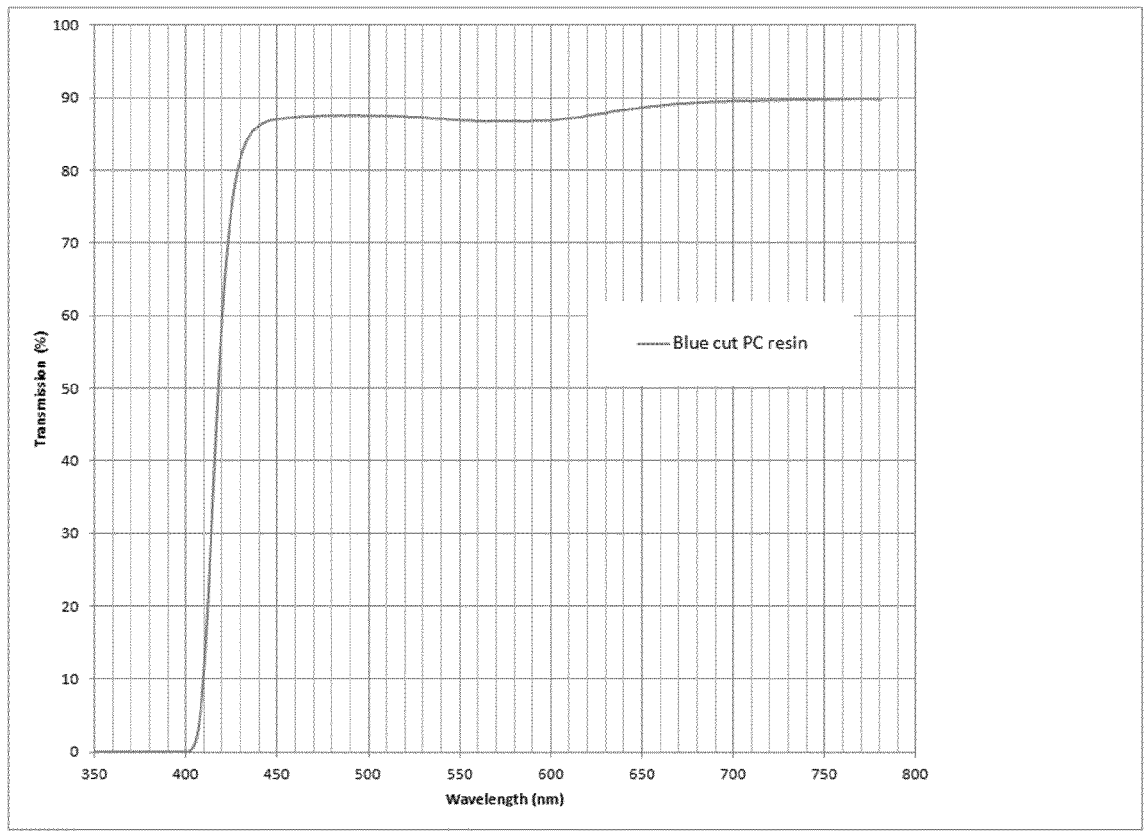
FIG. 2 is a graph depicting the transmission spectrum of one embodiment of a blue-cut polycarbonate resin lens.

The blue-cut performance of a lens is a function of the transmittance T($\lambda$), which is directly linked to its color appearance corresponding to a specific transmission spectrum. Hence, it is important for a lens to have consistent and stable color to achieve constant blue-cut performance. During lens injection molding processes, insufficient protection from heat and oxidation may cause a lens color to vary. A typical indicator of lens color variation is the continuous evolution of the yellowness index (YI) from lens to lens (FIG. 1). Lens color could also change due to photo-degradation of the base PC resin and the constituent additives and colorants. The increase of YI during the production of successive lenses indicates that heat and/or oxidation are adversely affecting lens quality.

In order to enhance protection of commercial PC resins of 400 nm UV cut-off from degradation/oxidation due to high heat, an antioxidant or heat stabilizer such as a benzenepropanoic acid may be added to a base PC resin. 3(1,1-dimethylethyl)-4-hydroxy-5-methyl-1,1'-[1,2-ethanediylbis (oxy-2,1-e-thanediyl)] ester is a commercially available benzenepropanoic acid sold under the name Irganox® 245 sold by Ciba part of BASF. In some embodiments, 0.05 to 1% by weight of a benzenepropanioc acid is added. In order to reduce or prevent photo-degradation of the resulting lenses, a light stabilizer may be added to a base PC resin. In some embodiments, the light stabilizer bis(1,2,2,6,6-pentamethyl-4-piperidinyl)-[[3,5-bis(1,1-dimethylethyl)-4-hydroxyphenyl]methyl]butylmalonate may be added to a base PC resin. This compound is commercially available as Tinuvin® 144, and is sold by Ciba part of BASF. In some aspects, 0.05 to 1% by weight of a light stabilizer is added to the resin Experimental Section
Injection Molding of a commercial PC resin
Injection molding of 1.50B SFSV lenses with Teijin Panlite L-1250VX PC resin having 400 nm UV-cut was carried out using a Nissei FN4000 injection molding machine with the following process parameters:
Melt temperature: 515 F
Mold temperature: 270 F
Screw speed: 15 rpm
Injection speed: 6%
Packing pressure: 1220 psi
Packing time: 10 s
Cooling time: 250 s The graph depicted in FIG. 1 illustrates the YI and BVC(B') data of the resulting comparative lenses. As seen in FIG. 1, the upward drift of YI and the evolution of BVC(B') are apparent, which demonstrate clearly the insufficiency of commercial PC resins of 400 nm UV cut-off in maintaining the color stability and blue-cut performance during injection molding.

According to the invention, a combination of various additives including UV blockers, antioxidants, light stabilizers, for example, hindered amine light stabilizers, and colorants may be added to the above polycarbonate base resin before being formed into optical lenses to maintaining the color stability and blue-cut performance during injection molding and produce clear blue-cut performance lenses with stable color.

The claims are not to be interpreted as including means-plus- or step-plus-function limitations, unless such a limitation is explicitly recited in a given claim using the phrase(s) "means for" or "step for," respectively.

The invention claimed is:

1. A high blue-cut performance polycarbonate resin composition for use in clear lenses comprising:
a polycarbonate polymer base resin;
0.05 to 1% by weight of a UV absorber, based on the weight of the base resin;
0.05 to 1% by weight of an antioxidant, based on the weight of the base resin;
at least one selective blue blocking filter that at least partially blocks blue light in a wavelength range chosen within the 400-460 nm range;
a colorant additive; and
0.05 to 1% by weight of a hindered amine light stabilizer, based on the weight of the base resin;
wherein:
the resin composition blocks>99% of light with a wavelength less than 400 nm at each wavelength in the wavelength range of 315-400 nm; and
the color stability and blue-cut performance of the resin composition are maintained during an injection molding process.

2. The polycarbonate resin composition of claim 1, wherein a weight average molecular weight of the polycarbonate polymer base resin ranges from about 20,000 to about 40,000 g/mol.

3. The polycarbonate resin composition of claim 1, wherein the UV absorber is a benzotriazole absorber.

4. The polycarbonate resin composition of claim 3, wherein the UV absorber is 2-(5-chloro-2H-benzotriazole-2-yl)-6-(1,1-dimethylethyl)-4-methyl phenol.

5. The polycarbonate resin composition of claim 1, wherein the colorant additive is a blue dye, a violet dye, a red dye, or any combination thereof.

6. The polycarbonate resin composition of claim 1, wherein the colorant additive is 1,4-di(2,6-dibromo-4-methylphenylamino) anthracene-9,10-dione.

7. The polycarbonate resin composition of claim 1, wherein the antioxidant is a benzenepropanoic acid ester.

8. The polycarbonate resin composition of claim 7, wherein the antioxidant is benzenepropanoic acid, 3(1,1-dimethylethyl)-4-hydroxy-5-methyl-1,1'-[1,2-ethanediylbis(oxy-2,1-ethanediyl)] ester.

9. The polycarbonate resin composition of claim 1, wherein the hindered amine light stabilizer is bis(1,2,2,6,6-pentamethyl-4-piperidinyl)-[[3,5-bis(1,1-dimethylethyl)-4-hydroxyphenyl]methyl]butylmalonate.

10. A clear lens comprising a high blue-cut performance polycarbonate resin composition, comprising:
a polycarbonate polymer base resin;
0.05 to 1% by weight of a UV absorber, based on the weight of the base resin;
0.05 to 1% by weight of an antioxidant, based on the weight of the base resin;
at least one selective blue blocking filter that at least partially blocks blue light in a wavelength range chosen within the 400-460 nm range;
a colorant additive; and
0.05 to 1% by weight of a hindered amine light stabilizer, based on the weight of the base resin;
wherein:
the resin composition blocks>99% of light with a wavelength less than 400 nm at each wavelength in the wavelength range of 315-400 nm;
the color stability and blue-cut performance of the resin composition are maintained during an injection molding process; and
a D65 transmittance of a 1.1 mm thick clear lens is greater than 85%.

11. The clear lens of claim 10, wherein the clear lens comprises a BVC(B') value of ≥20%.

12. The clear lens of claim 11, wherein the clear lens further comprises a wafer overmold for increasing at least one of blue-cut performance, color balance, and lens clarity.

13. A method for maintaining the color stability and blue-cut performance of a resin composition during an injection molding process, comprising:
obtaining a base resin comprising a polycarbonate polymer base resin and adding to said base resin 0.05 to 1% by weight of a UV absorber, based on the weight of the base resin, 0.05 to 1% by weight of an antioxidant, based on the weight of the base resin, at least one selective blue blocking filter that at least partially blocks blue light in a wavelength range chosen within the 400-460 nm range, a colorant additive and 0.05 to 1% by weight of a hindered amine light stabilizer, based on the weight of the base resin,
injection molding the resin composition to produce a high blue-cut performance polycarbonate clear lens,
wherein the lens blocks>99% of light with a wavelength less than 400 nm at each wavelength in the wavelength range of 315-400 nm.

* * * * *